US012555559B2

(12) United States Patent
Nakashima

(10) Patent No.: US 12,555,559 B2
(45) Date of Patent: Feb. 17, 2026

(54) SOUND ADJUSTMENT METHOD AND SOUND ADJUSTMENT DEVICE

(71) Applicant: Panasonic Intellectual Property Management Co., Ltd., Osaka (JP)

(72) Inventor: Tsukasa Nakashima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 215 days.

(21) Appl. No.: 18/227,041

(22) Filed: Jul. 27, 2023

(65) Prior Publication Data

US 2025/0037694 A1 Jan. 30, 2025

(51) Int. Cl.
*G10K 11/178* (2006.01)

(52) U.S. Cl.
CPC .................. *G10K 11/17823* (2018.01); *G10K 2210/1281* (2013.01)

(58) Field of Classification Search
None
See application file for complete search history.

(56) References Cited

U.S. PATENT DOCUMENTS 10,679,600 B2 * 6/2020 Kubota ............ G10K 11/17817
2007/0273556 A1 11/2007 Gyde et al.

FOREIGN PATENT DOCUMENTS

JP 2017-195528 10/2017

OTHER PUBLICATIONS

Extended European Search Report issued Mar. 20, 2024 in corresponding European Patent Application No. 23201093.4.
Heow Pueh Lee et al., "Assessment of in-cabin noise of wide-body aircrafts", Applied Acoustics, Vo. 194, pp. 1-13, 2022.
Dwight E. Bishop., "Cruise Flight Noise Levels in a Turbojet Transport Airplane", Noise Control, vol. 7, pp. 37-42, 1961.

* cited by examiner

*Primary Examiner* — Fan S Tsang
(74) *Attorney, Agent, or Firm* — Wenderoth, Lind & Ponack, L.L.P.

(57) ABSTRACT

A sound adjustment method of an aircraft is provided. The sound adjustment method includes acquiring a sound signal; acquiring flight state information of the aircraft; amplifying the sound signal having a first frequency or lower when the flight state information indicates ascending or descending of the aircraft; and amplifying the sound signal having a second frequency or lower when the flight state information indicates level flight of the aircraft. The second frequency is lower than the first frequency. The amplified sound signal is output.

12 Claims, 12 Drawing Sheets

DURING LEVEL FLIGHT

DURING LEVEL FLIGHT
(SOUND SOURCE PROCESSED)

SOUND ADJUSTMENT METHOD AND SOUND ADJUSTMENT DEVICE

TECHNICAL FIELD

The present disclosure relates to a sound adjustment method and a sound adjustment device for adjusting an output sound source according to a flight state of an aircraft.

BACKGROUND ART

Patent Literature 1 discloses a wireless device that detects a noise level according to an ambient noise environment and amplifies an audio signal based on a threshold. The wireless device includes a reception unit configured to receive a wireless signal, an amplification unit configured to amplify an audio signal reproduced from the wireless signal, a microphone configured to capture an ambient environmental sound, a derivation unit configured to derive a noise level, and a control unit configured to control the amplification unit. Accordingly, an audio signal subjected to amplification suitable for an environmental sound can be obtained.

CITATION LIST

Patent Literature

Patent Literature 1: JP2017-195528A

SUMMARY OF INVENTION

The present disclosure provides a passenger with a sound corresponding to a variation in hearing characteristics depending on a flight state of an aircraft.

Solution to Problem

A sound adjustment method of an aircraft includes acquiring a sound signal, acquiring flight state information of the aircraft, amplifying the sound signal having a first frequency or lower when the flight state information indicates ascending or descending of the aircraft, and amplifying the sound signal having a second frequency or lower when the flight state information indicates level flight of the aircraft, the second frequency being lower than the first frequency.

Further, a sound adjustment device includes a signal acquisition unit configured to acquire a sound signal, a state acquisition unit configured to acquire flight state information of an aircraft, and an amplification unit configured to amplify and output the sound signal. In a case that the flight state information indicates ascending or descending of the aircraft, the amplification unit amplifies and outputs the sound signal having a first frequency or lower. In a case that the flight state information indicates level flight of the aircraft, the amplification unit amplifies and outputs the sound signal having a second frequency or lower. The second frequency is lower than the first frequency.

The sound adjustment method and the sound adjustment device according to the present disclosure can provide a passenger with a sound corresponding to a variation in auditory characteristics depending on a flight state of an aircraft.

DESCRIPTION OF EMBODIMENTS

Hereinafter, embodiments will be described in detail with reference to the accompanying drawings. An unnecessarily detailed description may be omitted. For example, a detailed description of already well-known matters and a redundant description of substantially the same configuration may be omitted. This is to avoid the following description from being unnecessarily redundant and facilitate understanding for those skilled in the art.

The accompanying drawings and the following description are provided for those skilled in the art to fully understand the present disclosure and are not intended to limit the subject matters described in the claims.

First Embodiment

Hereinafter, a first embodiment will be described with reference to FIGS. 1 to 8.

1-1. Configuration

1-1-1. Outline of Seat Areas in Aircraft

Figure 1A:
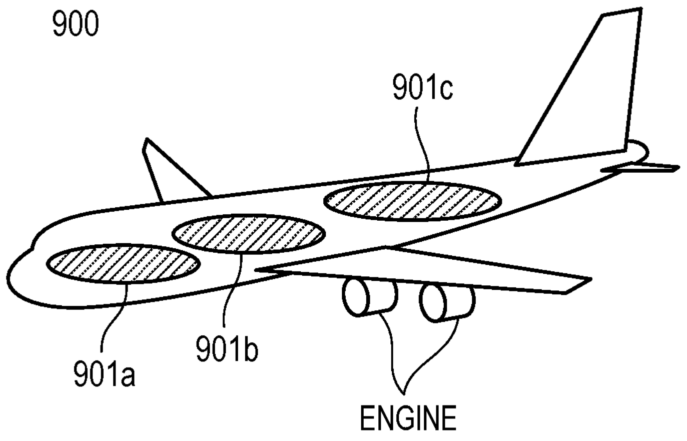
FIG. 1A is a schematic diagram of a seat area in an aircraft.
Figure 1B:
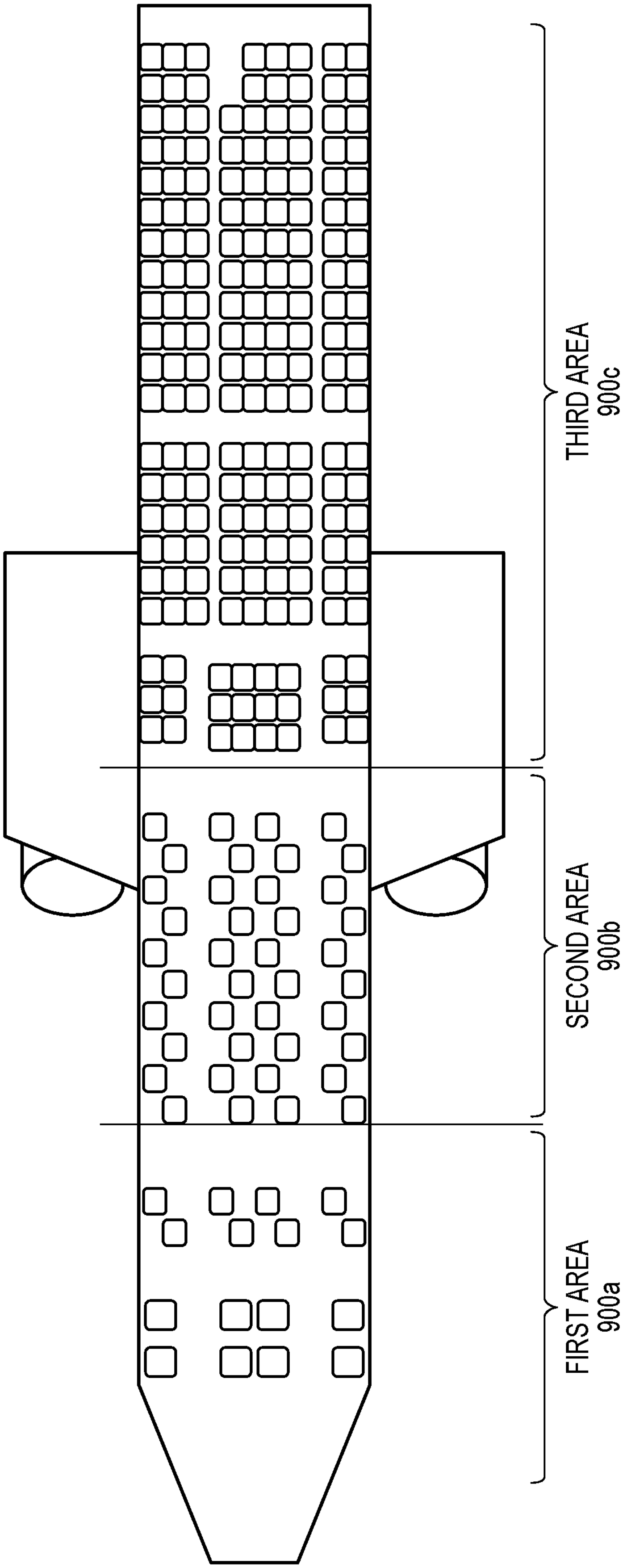
FIG. 1B is another schematic diagram of the seat area in the aircraft.

FIGS. 1A and 1B are schematic diagrams of seat areas in an aircraft. An aircraft 900 includes at least seats of a first area 901*a* (for example, a first class), a second area 901*b* (for example, a business class), and a third area 901*c* (for example, an economy class) in the aircraft.

The aircraft described above ascends and descends during flight. At this time, a pressure in the aircraft changes due to a change in altitude. Specifically, although the pressure is adjusted by a pressurization system so that a human body is not affected, it is difficult to keep the pressure constant, and basically, the pressure decreases during ascending and increases during descending. Due to the change in pressure, hearing of a passenger changes.

Figure 2:
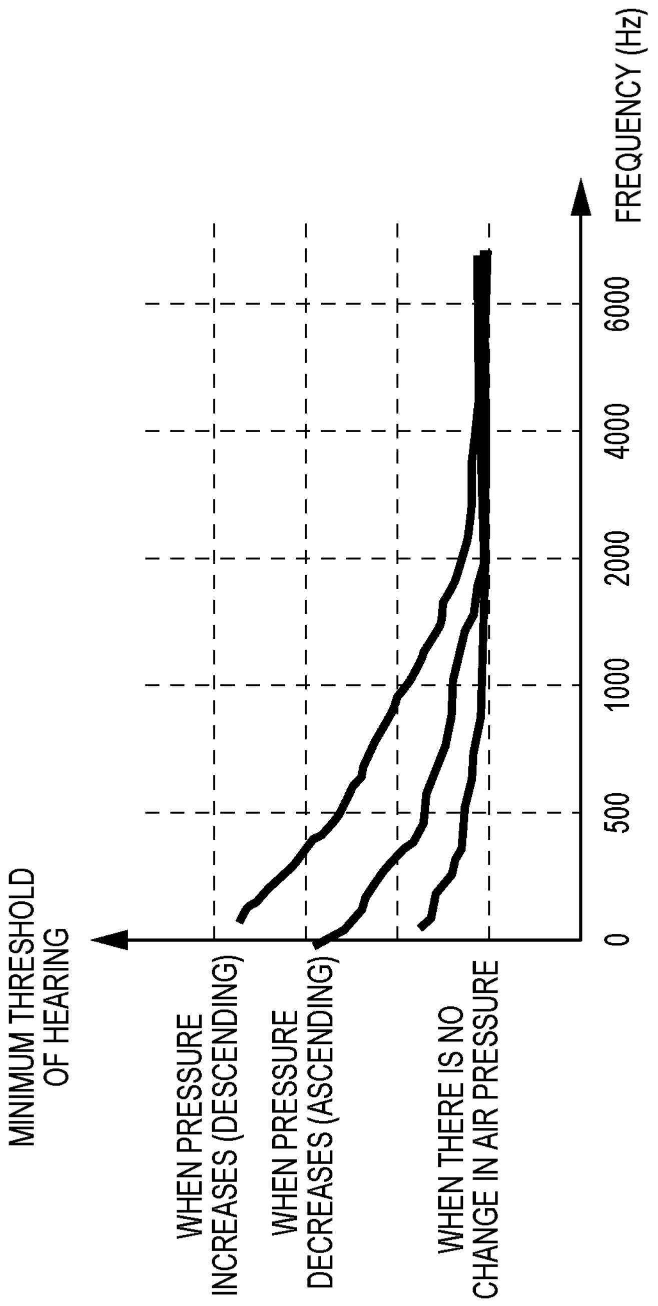
FIG. 2 is a graph illustrating a change in a minimum threshold of hearing due to a pressure change.

1-1-2. Increase of Minimum Threshold of Hearing Due to Pressure Change Accompanying Ascending and Descending of Aircraft The change in hearing of a passenger will be described with reference to FIG. 2. FIG. 2 is a graph illustrating a change in the minimum threshold of hearing due to a pressure change outside an eardrum. In the graph, magnitudes of audible minimum sounds in respective frequency bands are plotted, and as a frequency in the frequency bands decreases, a minimum threshold of hearing increases. As compared with that in a normal state in which an air pressure does not change, the minimum thresholds of hearing during both the ascending and descending of the aircraft are larger. In particular, when the aircraft is descending, that is, when the pressure outside the eardrum increases, an increase in the minimum threshold of a low frequency band is mainly remarkable. When the aircraft is ascending, that is, when the pressure outside the eardrum decreases, an increase in the minimum threshold of hearing is observed although less influence than that during the descending is received.

1-1-3. Noise Level in Each Seat Area During Level Flight

Figure 3:
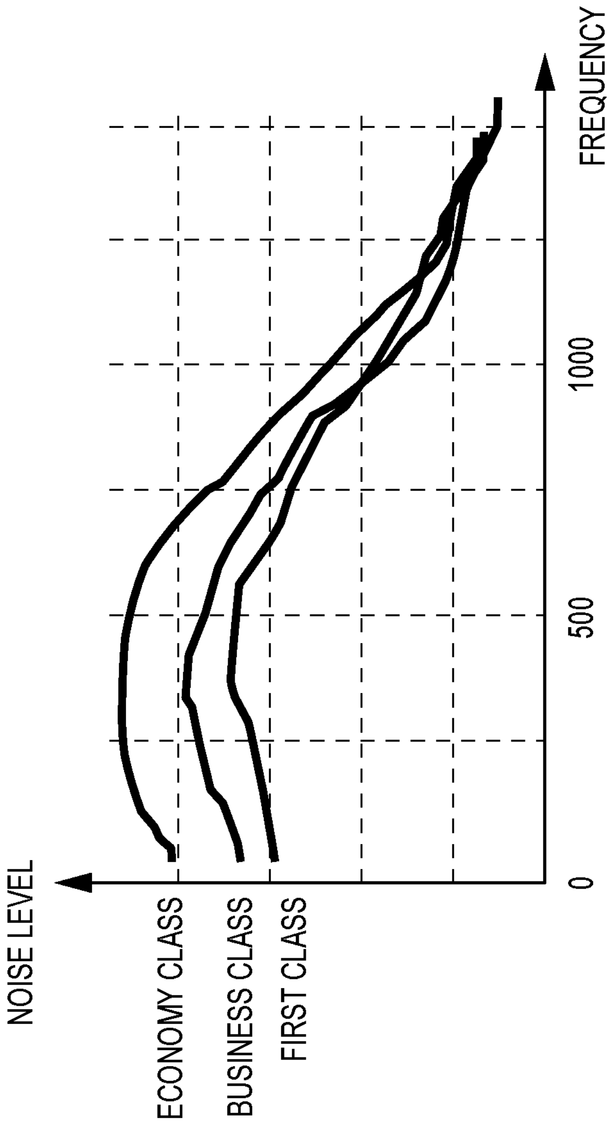
FIG. 3 is a graph illustrating noise levels in respective seat areas.

An influence on hearing is exerted even during level flight other than the ascending and descending. FIG. 3 is a graph schematically illustrating a state of noise levels in respective seat classes (areas). The noise levels increase in order of the first class, the business class, and the economy class. The closer to an engine of the aircraft, the larger the noise. In general, the noise level increases toward the rear of the aircraft. As described above, the current problems include an increase in the minimum threshold of hearing of a passenger during ascending and descending and a difference in noise level during level flight. Therefore, in order to solve these two problems, the present disclosure provides a sound adjustment device.

1-1-4. Configuration of Sound Adjustment Device

Figure 4:
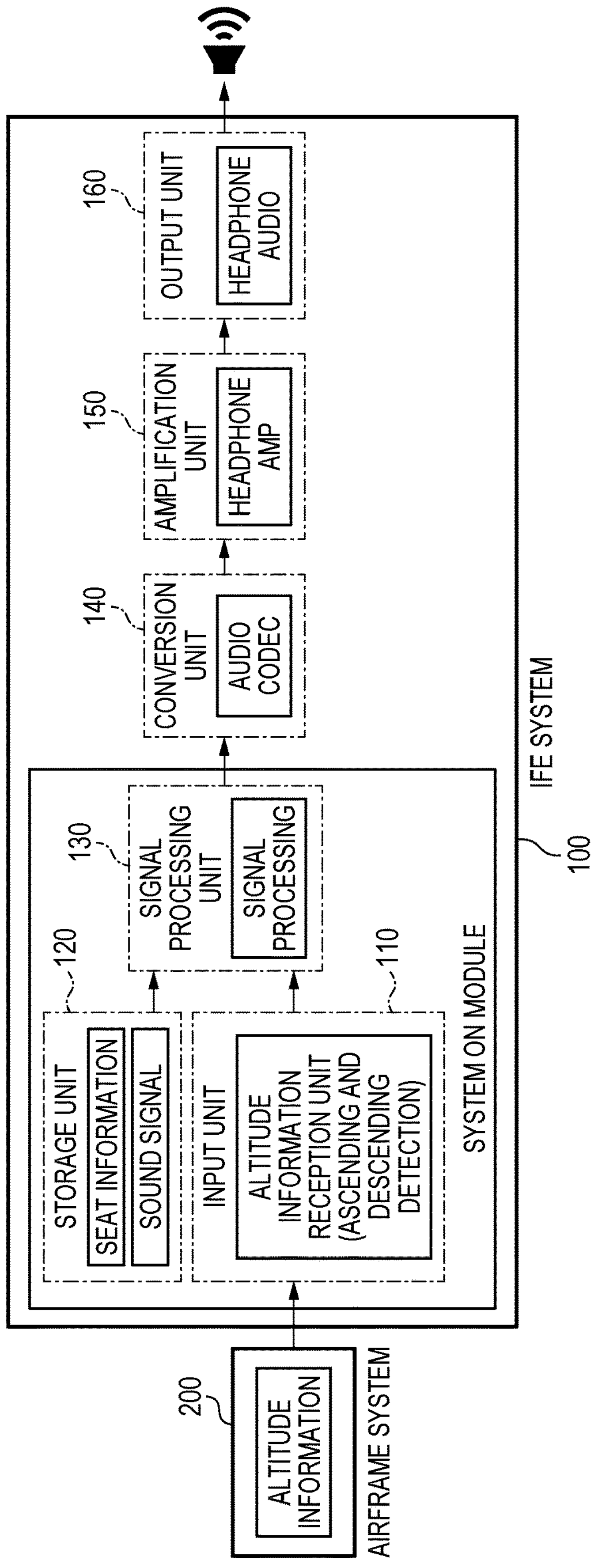
FIG. 4 is a block diagram illustrating a sound adjustment device.

A sound adjustment device that executes a sound adjustment method of the present disclosure will be described. FIG. 4 is a block diagram illustrating the sound adjustment device. A sound adjustment device (In-Flight Entertainment (IFE) system) 100 includes an input unit 110, a storage unit 120, a signal processing unit 130, a conversion unit 140, an amplification unit 150, and an output unit 160. An airframe system 200 communicates with the sound adjustment device 100 to transmit information such as altitude information of the aircraft, and is installed on the aircraft. The sound adjustment device 100 is disposed at each seat in the aircraft.

The airframe system 200 stores the altitude information of the aircraft acquired, at any time, from a sensor or the like provided in the aircraft. The input unit 110 receives the altitude information as flight state information, and detects ascending and descending of the aircraft. The storage unit 120 stores seat information and a sound reproduced by the sound adjustment device 100, that is, a sound signal. The sound signal may be received from the airframe system 200 without being stored in the sound adjustment device 100. The signal processing unit 130 performs signal processing of a sound signal (digital audio signal) based on information (seat information and sound signal) of the storage unit 120 and information of the input unit 110. The conversion unit 140 converts the digital audio signal into an analog audio signal. The amplification unit 150 amplifies, using a headphone amplifier, the analog audio signal to a sound volume at which the audio signal can be heard, that is, amplifies the audio signal to a sound volume at which the sound signal can be heard. The output unit 160 outputs the amplified audio signal.

1-2. Operations

1-2-1. Operations of Sound Adjustment Device

Figure 5:
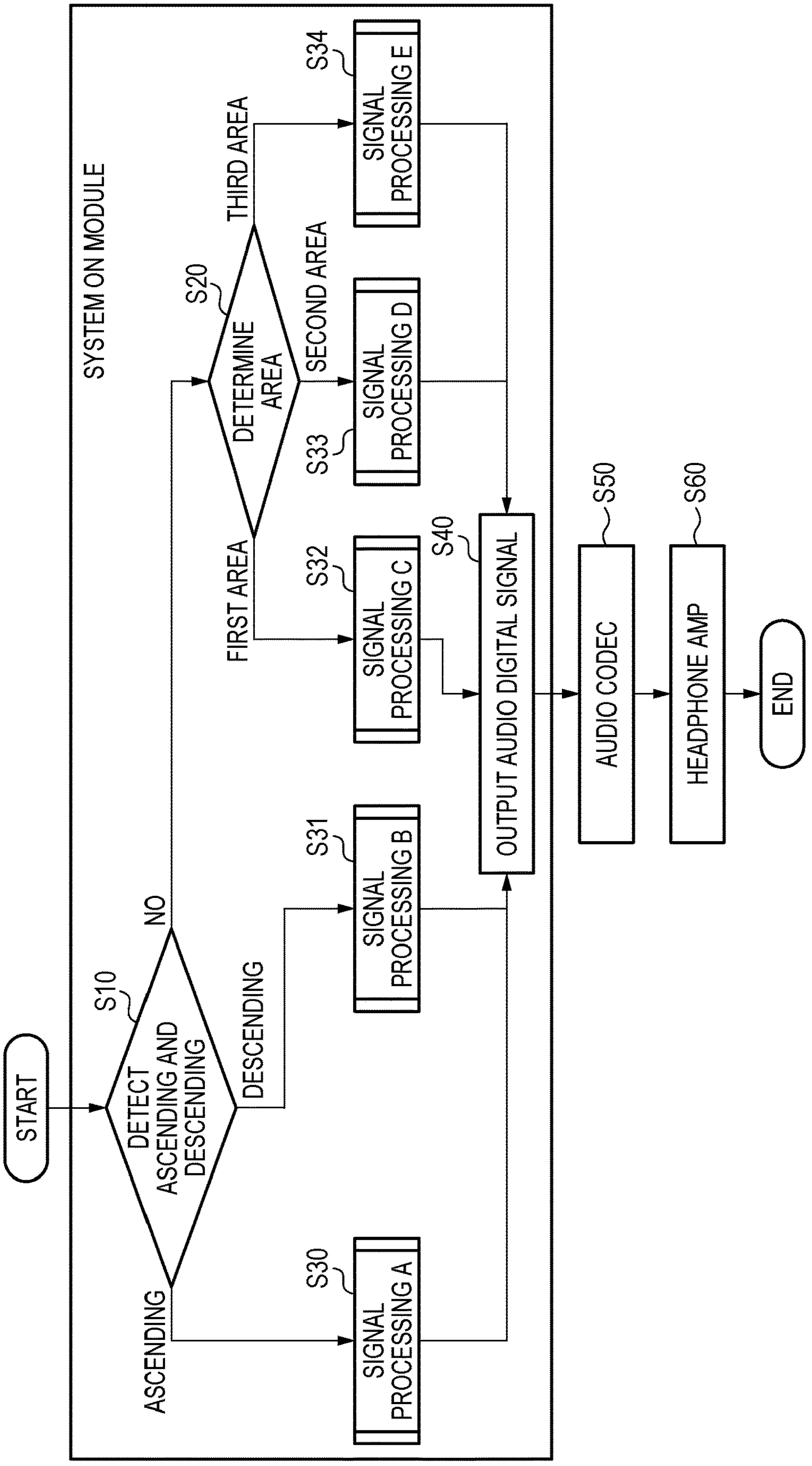
FIG. 5 is a flowchart illustrating operations of the sound adjustment device.

Operations of the sound adjustment device 100 configured as described above will be described. FIG. 5 is a flowchart illustrating operations of a sound reproduction method of the present disclosure. First, the input unit 110 in FIG. 4 acquires altitude information from the airframe system 200, and detects a flight state of the aircraft, that is, ascending or descending based on the altitude information (S10). When ascending is detected, the signal processing unit 130 performs signal processing A (details will be described later) of amplifying a specific frequency band of an audio signal (S30) and outputs the amplified audio signal (S40). Thereafter, the signal is converted into an analog audio signal by the conversion unit 140 (S50), and the analog audio signal is amplified via the amplification unit 150 (S60).

When descending is detected by the input unit 110 (S10), the signal processing unit 130 performs signal processing B (details will be described later) of amplifying a specific frequency band of an audio signal (S31) and outputs the amplified audio signal (S40). Thereafter, similarly to the case of ascending, the signal is converted into an analog audio signal by the conversion unit 140 (S50), and the analog audio signal is amplified via the amplification unit 150 (S60).

When neither ascending nor descending is detected by the input unit 110 (S10), the signal processing unit 130 receives seat information from the storage unit 120 (S20). When the seat area is the first area, the signal processing unit 130 performs signal processing C (details will be described later) for amplifying a specific frequency band of an audio signal (S32) and outputs the amplified audio signal (S40). Thereafter, similarly to the case of ascending, the signal is converted into an analog audio signal by the conversion unit 140 (S50), and the analog audio signal is amplified via the amplification unit 150 (S60).

When the seat area is the second area, the signal processing unit 130 performs signal processing D (details will be described later) for amplifying a specific frequency band of an audio signal (S33) and outputs the amplified audio signal (S40). Thereafter, similarly to the case of ascending, the signal is converted into an analog audio signal by the conversion unit 140 (S50), and the analog audio signal is amplified via the amplification unit 150 (S60).

When the seat area is the third area, the signal processing unit 130 performs signal processing E (details will be described later) for amplifying a specific frequency band of an audio signal (S34) and outputs the amplified audio signal (S40). Thereafter, similarly to the case of ascending, the signal is converted into an analog audio signal by the conversion unit 140 (S50), and the analog audio signal is amplified via the amplification unit 150 (S60).

1-2-2. Operation Example

Figure 6:
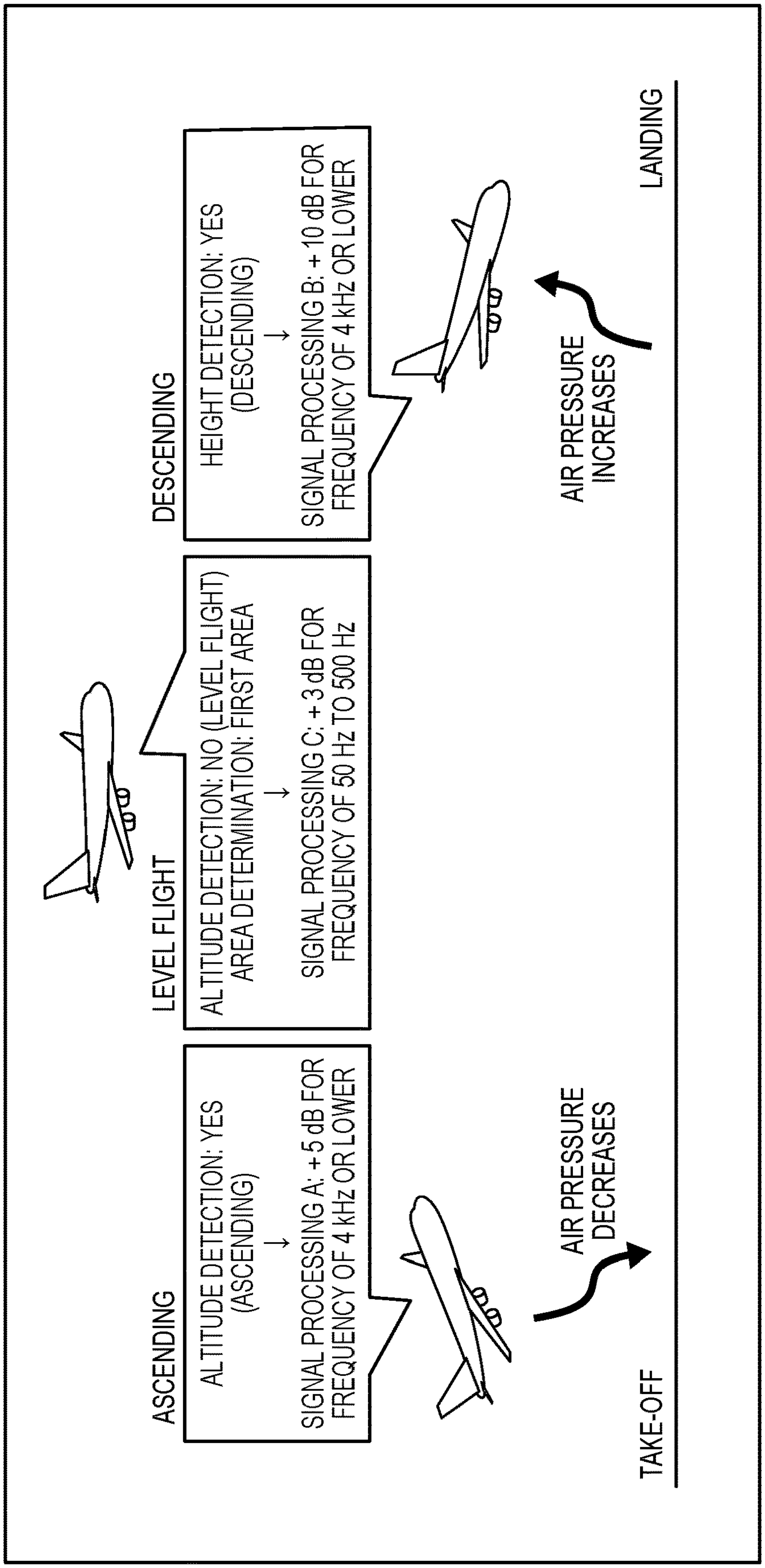
FIG. 6 is a schematic diagram of a series of operations from take-off to landing of an aircraft.

FIG. 6 is a schematic diagram of a series of operations from aircraft take-off to landing. Hereinafter, operations of each flight state will be described in detail.

1-2-3. Operations During Ascending of Aircraft

First, a case where the aircraft ascends will be described. During ascending of the aircraft, the air pressure in the aircraft decreases. At this time, the input unit 110 detects the ascending of the aircraft based on the altitude information from the airframe system 200. In response to detection from the input unit 110, the signal processing unit 130 performs the signal processing A. In the signal processing A, sound signals having a frequency equal to or lower than a predetermined frequency (equal to or lower than a first frequency) are amplified in the entire cabin of the aircraft, regardless of division of the seat areas of the aircraft. Specifically, a frequency band of 4000 Hz or lower of the digital audio signal is amplified by 5 dB. Thereafter, the digital audio signal is output to the passenger's sound adjustment device 100 as an analog audio signal through the conversion unit 140, the amplification unit 150, and the output unit 160.

Figure 7A:
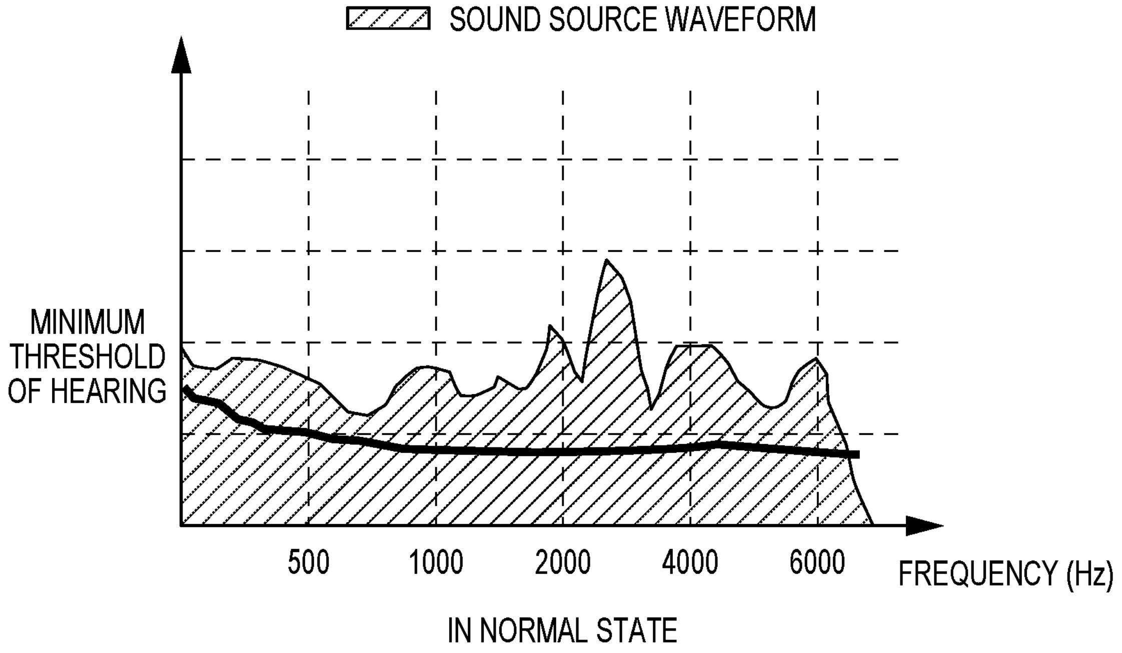
FIG. 7A is a graph illustrating a minimum threshold of hearing on the ground and a sound source waveform.
Figure 7B:
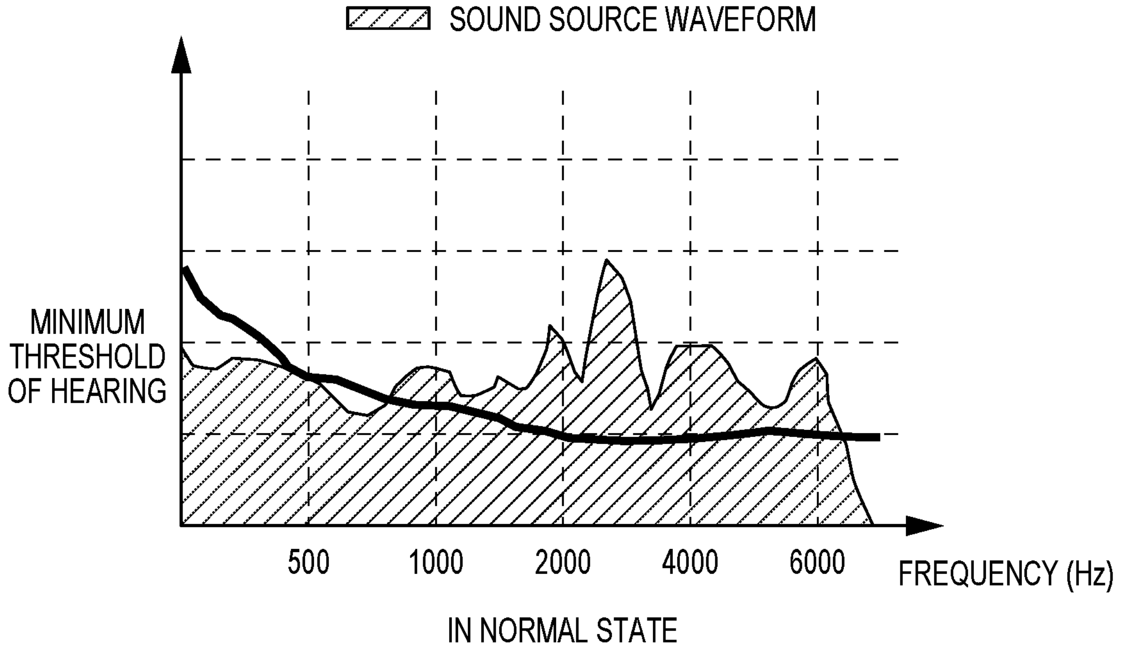
FIG. 7B is a graph illustrating a minimum threshold of hearing during ascending and a sound source waveform before signal processing.
Figure 7C:
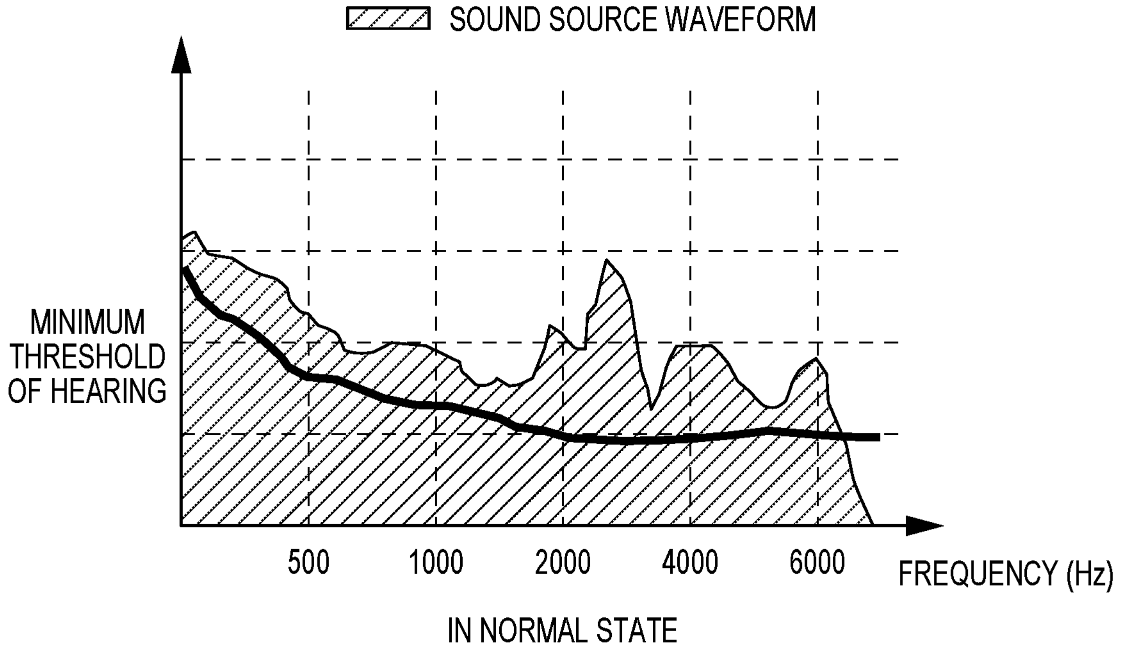
FIG. 7C is a graph illustrating the minimum threshold of hearing during ascending and a sound source waveform after the signal processing.

Here, FIGS. 7A, 7B, and 7C illustrate processing examples of the signal processing A. FIG. 7A is a graph illustrating a sound source waveform before execution of the signal processing on the ground and a minimum threshold of hearing at that time. FIG. 7B is a graph illustrating a sound source waveform before execution of the signal processing during ascending of the aircraft and a minimum threshold of hearing at that time. FIG. 7C is a graph illustrating a sound source waveform after execution of the signal processing during ascending of the aircraft and a minimum threshold of hearing at that time.

As illustrated in FIG. 7A, in the case of being on the ground, that is, in the case where there is no change in air pressure, the sound source waveform exceeds the minimum threshold of hearing, and the passenger can hear a sound source without amplification. However, as illustrated in FIG. 7B, when the aircraft ascends and the air pressure changes, the minimum threshold of hearing increases, and a sound source of a frequency band that cannot be heard by the passenger comes out. Therefore, by amplifying a sound source in a frequency band of 4000 Hz or lower as illustrated in FIG. 7C, the passenger can hear the sound source as in the same manner as they are on the ground. In FIG. 7C, since sounds from 2000 Hz to 4000 Hz greatly exceed the minimum threshold of hearing, sounds of 2000 Hz or lower are mainly amplified.

1-2-4. Operations During Level Flight of Aircraft

Next, a case of level flight of the aircraft will be described. During level flight of the aircraft, the air pressure in the aircraft is kept substantially constant. Since the altitude information of the airframe system 200 does not change greatly, that is, the flight state does not change, the input unit 110 does not detect the ascending or descending. Therefore, as described above, instead of uniformly performing signal processing in the entire cabin of the aircraft, seat area determination is performed. Seat information is acquired from storage unit 120, and the signal processing C, the signal processing D, and the signal processing E are performed according to the seat information. In the signal processing C, D, and E, a sound signal of a second frequency or lower is amplified, the second frequency being lower than the first frequency. Specifically, sound signals in a frequency band of 50 Hz to 500 Hz are amplified by amplification amounts predetermined for each seat area. In the case of the first area (in the case of the signal processing C), the frequency band of 50 Hz to 500 Hz is amplified by 3 dB. In the case of the second area (in the case of the signal processing D), the frequency band of 50 Hz to 500 Hz is amplified by 5 dB. In the case of the third area (in the case of the signal processing E), the frequency band of 50 Hz to 500 Hz is amplified by 7 dB. The reason why the amplification amount is different for each area is that the noise level is different for each seat area as illustrate in FIG. 3, and thus the amplification amount of the third area (economy class) at the rear of the aircraft in which the noise is largest is made largest.

Figure 8A:
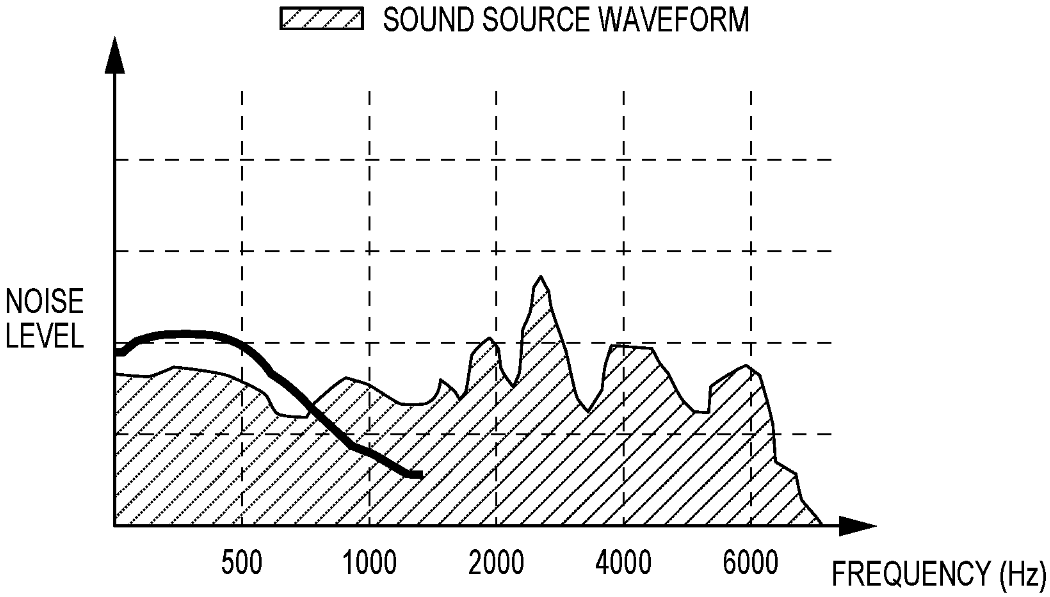
FIG. 8A is a graph illustrating a noise level during level flight and a sound source waveform before signal processing.
Figure 8B:
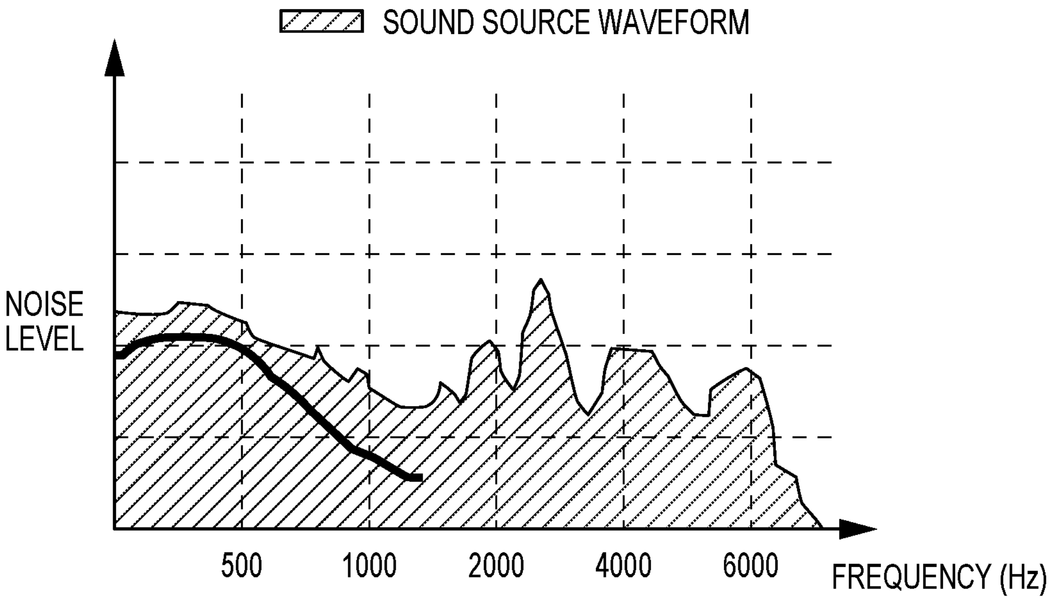
FIG. 8B is a graph illustrating the noise level during level flight and a sound source waveform after the signal processing.

Here, an example of the case of the first area (signal processing C) is illustrated in FIGS. 8A and 8B. FIG. 8A is a graph illustrating a sound source waveform and a noise level before execution of the signal processing. FIG. 8B is a graph obtained by amplifying the frequency band of 50 Hz to 500 Hz in the sound source waveform in FIG. 8A. As illustrated in FIG. 8B, by increasing the sound signal in the whole seat area so that the sound volume exceeds the noise level, the passenger can hear the sound source.

1-2-5. Operations During Descending of Aircraft

Finally, a case where the aircraft descends will be described. During descending of the aircraft, the air pressure in the aircraft increases. At this time, the input unit 110 detects the descending based on the altitude information of the aircraft from the airframe system 200. In response to the detection from the input unit 110, the signal processing unit 130 performs the signal processing B. In the signal processing B, sound signals having a frequency equal to or lower than a predetermined frequency (equal to or lower than the first frequency) are amplified in the entire cabin of the aircraft, regardless of division of the seat areas of the aircraft. Specifically, a frequency band of 4000 Hz or lower of the digital audio signal is amplified by 10 dB. Thereafter, the digital audio signal is output to the passenger's sound adjustment device 100 as an analog audio signal through the conversion unit 140, the amplification unit 150, and the output unit 160.

In the signal processing B, the frequency band to be amplified is the same as that in the signal processing A, but since a change amount of the minimum threshold of hearing is larger in the case of descending as illustrated in FIG. 2, that is, the minimum threshold of hearing is larger in the case of descending, the amplification amount is larger than that in the signal processing A.

1-3. Effects and the Like

As described above, in the present embodiment, the sound adjustment device 100 includes the input unit 110, the storage unit 120, the signal processing unit 130, the conversion unit 140, the amplification unit 150, and the output unit 160. Based on the information from the airframe system 200 and the storage unit 120, the signal processing is performed to amplify a frequency band in which the minimum threshold of the sound signal is increased and which has a large influence on the hearing of the passenger.

Accordingly, it is possible to output a sound, for which the variation in the hearing characteristics depending on a flight state of the aircraft is considered, to the passenger. That is, a high-quality sound is provided to the passenger of aircraft.

Other Embodiments

As described above, the first embodiment is described as an exemplification of the technique disclosed in the present application. However, the technique of the present disclosure is not limited thereto, and can also be applied to an embodiment in which a change, replacement, addition, omission, or the like is performed. It is also possible to combine the constituent elements described in the first embodiment to obtain a new embodiment.

Hereinafter, other embodiments will be exemplified.

In the first embodiment, the case where the seat classes are set is described. In a case where the seat classes are not set, the cabin may be divided into a front portion and a rear portion with aircraft main wings as a center, and the front portion may be further divided into halves, that is, a first front portion and a second front portion. Accordingly, the first front portion may be set as the first area 901*a*, the second front portion may be set as the second area 901*b*, and the rear portion may be set as the third area 901*c*. Although the seats in the aircraft are divided into three areas, the number of divisions may be any number.

In the first embodiment 1, the altitude information is used as the flight state information, and a flight state such as ascending and descending is determined based on the altitude information from the airframe system 200. Alternatively, information other than the altitude information from the airframe system 200 may be information for grasping the flight state of the aircraft, such as information based on a flight schedule.

In the first embodiment, the frequency band to be amplified by the signal processing section 130 during level flight of the aircraft is set to 50 Hz to 500 Hz. Alternatively, the frequency band may be appropriately set in accordance with a frequency band in which noise is generated.

In the first embodiment, an example is described in which the amplification amount of the signal processing unit 130 during the level flight of the aircraft is +3 dB for the first area, +5 dB for the second area, and +7 dB for the third area, and waveforms before and after the signal processing are illustrated. However, it is difficult to implement uniform amplification of a designated amplification amount within designated frequencies by setting of an equalizer. Therefore, it is sufficient to have setting of the equalizer with which the designated amplification amount is implemented at any one of the designated frequencies. Accordingly, an amplification degree of the signal processing unit 130 during the level flight is not limited to +3 dB, +5 dB, and +7 dB.

In the first embodiment, an example is described in which the amplification amount of the signal processing unit 130 during the level flight of the aircraft is +3 dB for the first area, +5 dB for the second area, and +7 dB for the third area, and waveforms before and after the signal processing are illustrated. It is sufficient that the amplification amounts are amplification amounts that increase in the order of the first area, the second area, and the third area. Accordingly, the amplification degree of the signal processing unit 130 during the level flight is not limited to +3 dB, +5 dB, and +7 dB.

In the first embodiment, an example is described in which the amplification amount of the signal processing unit 130 during descending of the aircraft is +10 dB, and waveforms before and after the signal processing are illustrated. However, it is difficult to implement uniform amplification of +10 dB within designated frequencies by setting of the equalizer. Therefore, it is sufficient to have setting of the equalizer with which +10 dB is implemented at any one of the designated frequencies. Accordingly, an amplification degree of the signal processing unit 130 during the descending is not limited to +10 dB.

In the first embodiment, an example is described in which the amplification amount of the signal processing unit 130 during the ascending of the aircraft is set to +5 dB, the amplification amount of the signal processing unit 130 during the descending of the aircraft is set to +10 dB, and waveforms before and after the signal processing are illustrated. When the sound signal after the processing exceeds the minimum threshold, the magnitude of the amplification amount is not limited during the ascending and the descending. Accordingly, the amplification degree of the signal processing unit 130 during the ascending is not limited to +5 dB, and the amplification degree of the signal processing unit 130 during the descending is not limited to +10 dB.

In the first embodiment, the amplification amount is determined in consideration of only the minimum threshold of hearing during the ascending and the descending. Alternatively, the amplification amount may be determined also in consideration of noise.

In the first embodiment, the sound adjustment method of the IFE entertainment system provided at each passenger seat in the aircraft is described. A speaker provided in an upper portion of the aircraft is also capable of outputting a sound source by the same procedure, and thus is not limited to the entertainment system mounted at each seat. In the case of the speaker, the sound signal is processed based on seat information on a seat in the vicinity of the speaker in addition to information on ascending and descending of the aircraft, and a sound source is output.

The above-described embodiments illustrate the technique disclosed in the present disclosure, and various changes, replacements, additions, omissions, and the like can be made within the scope of the claims or the equivalent scope thereof.

INDUSTRIAL APPLICABILITY

The present disclosure is applicable to a sound source output device that equalizes an output sound source. Specifically, the present disclosure is applicable to an entertainment system in an aircraft.

What is claimed is:

1. A sound adjustment method of an aircraft, the sound adjustment method comprising:

acquiring a sound signal;

acquiring flight state information of the aircraft;

amplifying the sound signal having a first frequency or lower when the flight state information indicates ascending or descending of the aircraft; and amplifying the sound signal having a second frequency or lower when the flight state information indicates level flight of the aircraft, the second frequency being lower than the first frequency, wherein an amplification amount of the sound signal having the first frequency or lower is fixed regardless of areas predetermined in the aircraft, and an amplification amount of the sound signal having the second frequency or lower differs depending on the areas.

2. The sound adjustment method according to claim 1, wherein an amplification amount of the sound signal having the first frequency or lower is larger during the descending of the aircraft than during the ascending of the aircraft.

3. The sound adjustment method according to claim 1, wherein an amplification amount of amplification during the descending of the aircraft is larger than an amplification amount of amplification during the level flight of the aircraft.

4. The sound adjustment method according to claim 1, wherein an amplification amount for the second frequency or lower increases in an order of a leading seat area to a trailing seat area in the aircraft.

5. A sound adjustment device comprising:

a signal acquisition unit configured to acquire a sound signal;

a state acquisition unit configured to acquire flight state information of an aircraft; and an amplification unit configured to amplify and output the sound signal, wherein in a case that the flight state information indicates ascending or descending of the aircraft, the amplification unit amplifies and outputs the sound signal having a first frequency or lower, and in a case that the flight state information indicates level flight of the aircraft, the amplification unit amplifies and outputs the sound signal having a second frequency or lower, the second frequency being lower than the first frequency, wherein an amplification amount of the sound signal having the first frequency or lower is fixed regardless of areas predetermined in the aircraft, and an amplification amount of the sound signal having the second frequency or lower differs depending on the areas.

6. The sound adjustment device according to claim 5, wherein an amplification amount of the sound signal having the first frequency or lower is larger during the descending of the aircraft than during the ascending of the aircraft.

7. The sound adjustment device according to claim 5, wherein an amplification amount of amplification during the descending of the aircraft is larger than an amplification amount of amplification during the level flight of the aircraft.

8. The sound adjustment device according to claim 5, wherein an amplification amount for the second frequency or lower increases in an order of a leading seat area to a trailing seat area.

9. A sound adjustment method of an aircraft, the sound adjustment method comprising:

acquiring a sound signal;

acquiring flight state information of the aircraft;

amplifying the sound signal having a first frequency or lower when the flight state information indicates ascending or descending of the aircraft; and amplifying the sound signal having a second frequency or lower when the flight state information indicates level flight of the aircraft, the second frequency being lower than the first frequency, wherein an amplification amount for the second frequency or lower increases in an order of a leading seat area to a trailing seat area in the aircraft.

10. The sound adjustment method according to claim 9, wherein an amplification amount of the sound signal having the first frequency or lower is fixed regardless of areas predetermined in the aircraft, and an amplification amount of the sound signal having the second frequency or lower differs depending on the areas.

11. The sound adjustment method according to claim 9, wherein an amplification amount of the sound signal having the first frequency or lower is larger during the descending of the aircraft than during the ascending of the aircraft.

12. The sound adjustment method according to claim 9, wherein an amplification amount of amplification during the descending of the aircraft is larger than an amplification amount of amplification during the level flight of the aircraft.

* * * * *